United States Patent
Shindo et al.

(10) Patent No.: US 7,021,075 B2
(45) Date of Patent: Apr. 4, 2006

(54) ELECTRIC-POWERED COMPRESSOR

(75) Inventors: Yusuke Shindo, Owariasahi (JP); Kenji Iriyama, Ogaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/889,046

(22) Filed: Jul. 13, 2004

(65) Prior Publication Data
US 2005/0011213 A1    Jan. 20, 2005

(30) Foreign Application Priority Data
Jul. 17, 2003   (JP) .............................. 2003-276198

(51) Int. Cl.
*F25D 23/12*   (2006.01)
(52) U.S. Cl. ...................... 62/259.2; 62/505
(58) Field of Classification Search ............... 62/228.1, 62/469, 228.4, 259.2, 505, 508; 417/44.1, 417/366, 410.1; 361/702
See application file for complete search history.

(56) References Cited

U.S. PATENT DOCUMENTS

| | | | |
|---|---|---|---|
| 5,004,149 A * | 4/1991 | Narikiyo et al. ........... | 236/49.3 |
| 5,050,233 A * | 9/1991 | Hitosugi et al. ............ | 417/427 |
| 6,321,563 B1 | 11/2001 | Ikeda et al. | |
| 6,501,662 B1 | 12/2002 | Ikeda | |
| 6,511,295 B1 * | 1/2003 | Suitou et al. .............. | 417/44.1 |
| 6,560,984 B1 | 5/2003 | Bellet | |
| 6,564,576 B1 * | 5/2003 | Shibuya ....................... | 62/505 |
| 6,599,104 B1 * | 7/2003 | Saito et al. ................. | 417/366 |
| 6,619,933 B1 * | 9/2003 | Ikeda ....................... | 417/410.1 |
| 6,659,738 B1 * | 12/2003 | Iwanami et al. ............ | 417/374 |
| 2003/0143090 A1 * | 7/2003 | Iritani et al. ............. | 417/410.5 |

FOREIGN PATENT DOCUMENTS

| | | |
|---|---|---|
| JP | A-2000-60149 | 2/2000 |
| JP | A-2000-291557 | 10/2000 |
| JP | A-2001-45601 | 2/2001 |
| JP | A-2001-211663 | 8/2001 |
| JP | 2003-153552 A * | 5/2003 |

\* cited by examiner

*Primary Examiner*—Mohammad M. Ali
(74) *Attorney, Agent, or Firm*—Posz Law Group, PLC

(57) ABSTRACT

An electric-powered compressor comprised of a compression mechanism 110 for sucking in and compressing a refrigerant and an electric motor 120 for driving the compression mechanism formed integrally and provided at a refrigerant suction side of the compression mechanism with a motor drive circuit 130 for driving the motor, wherein at least part of a control circuit 132 provided at the motor drive circuit and controlling the operation of a switching device 131 for adjusting the power supplied to the motor is provided abutting against the surface of the refrigerant suction side 121 or a heat conduction path 124 extending from the surface.

9 Claims, 7 Drawing Sheets

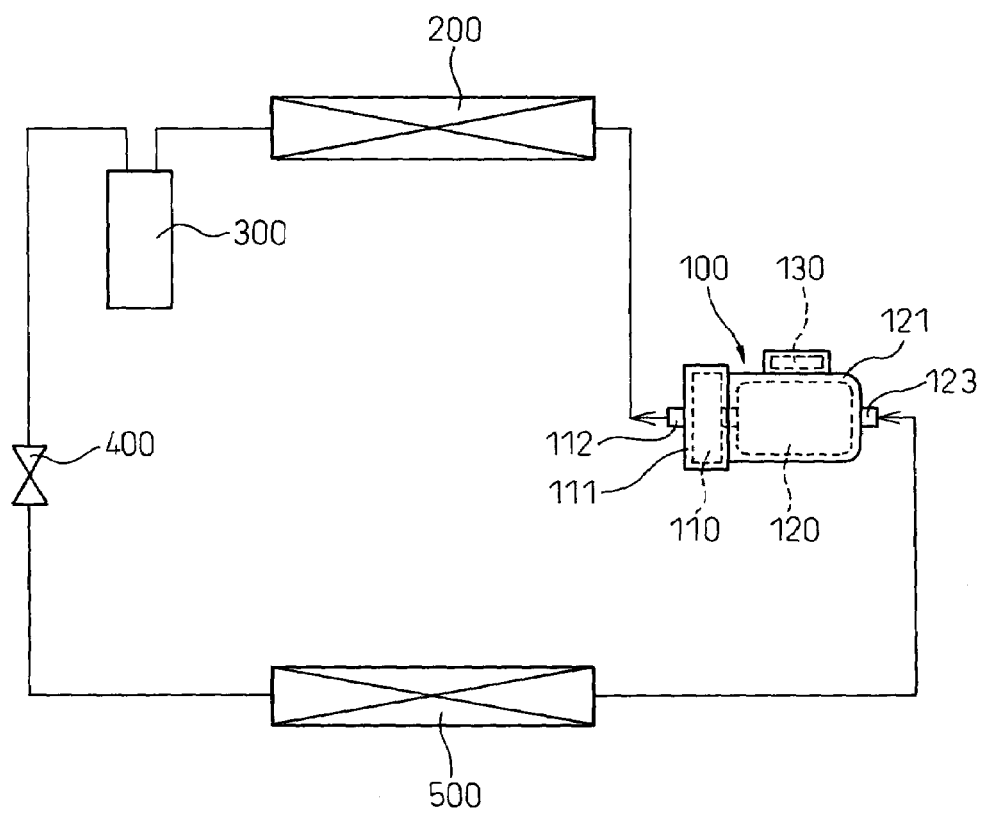

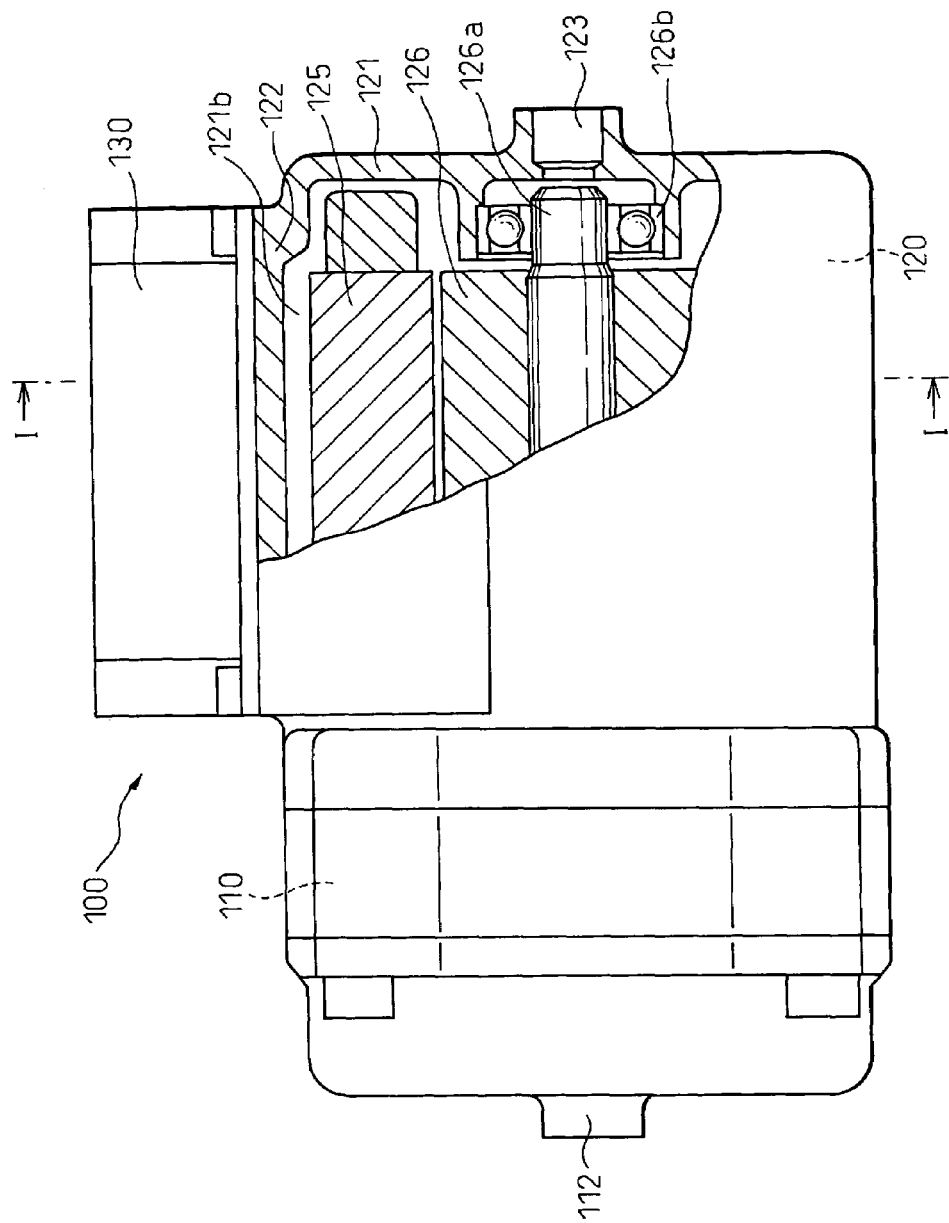

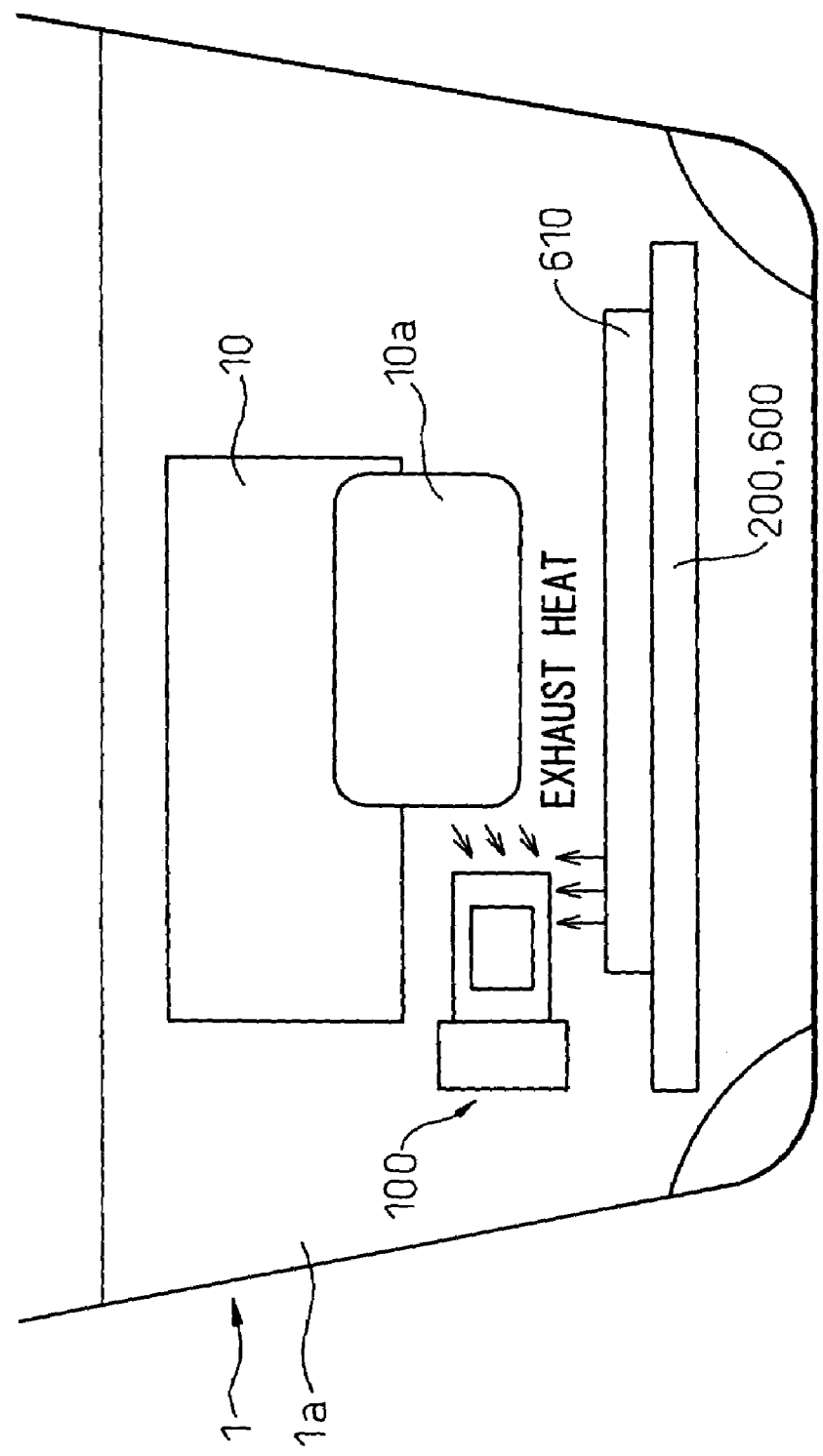

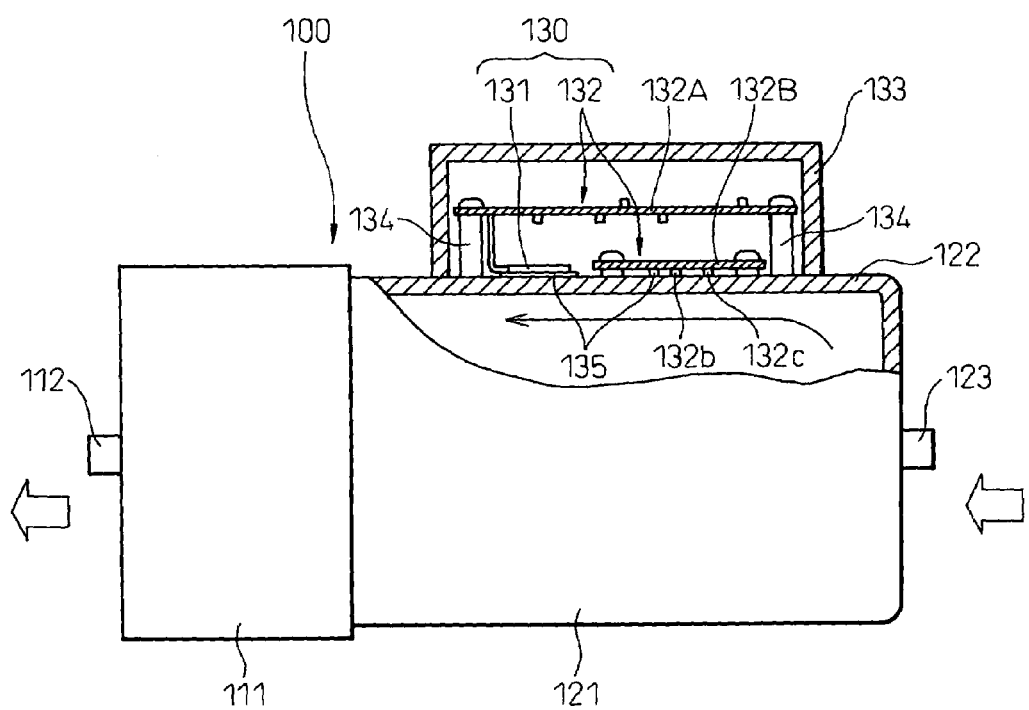

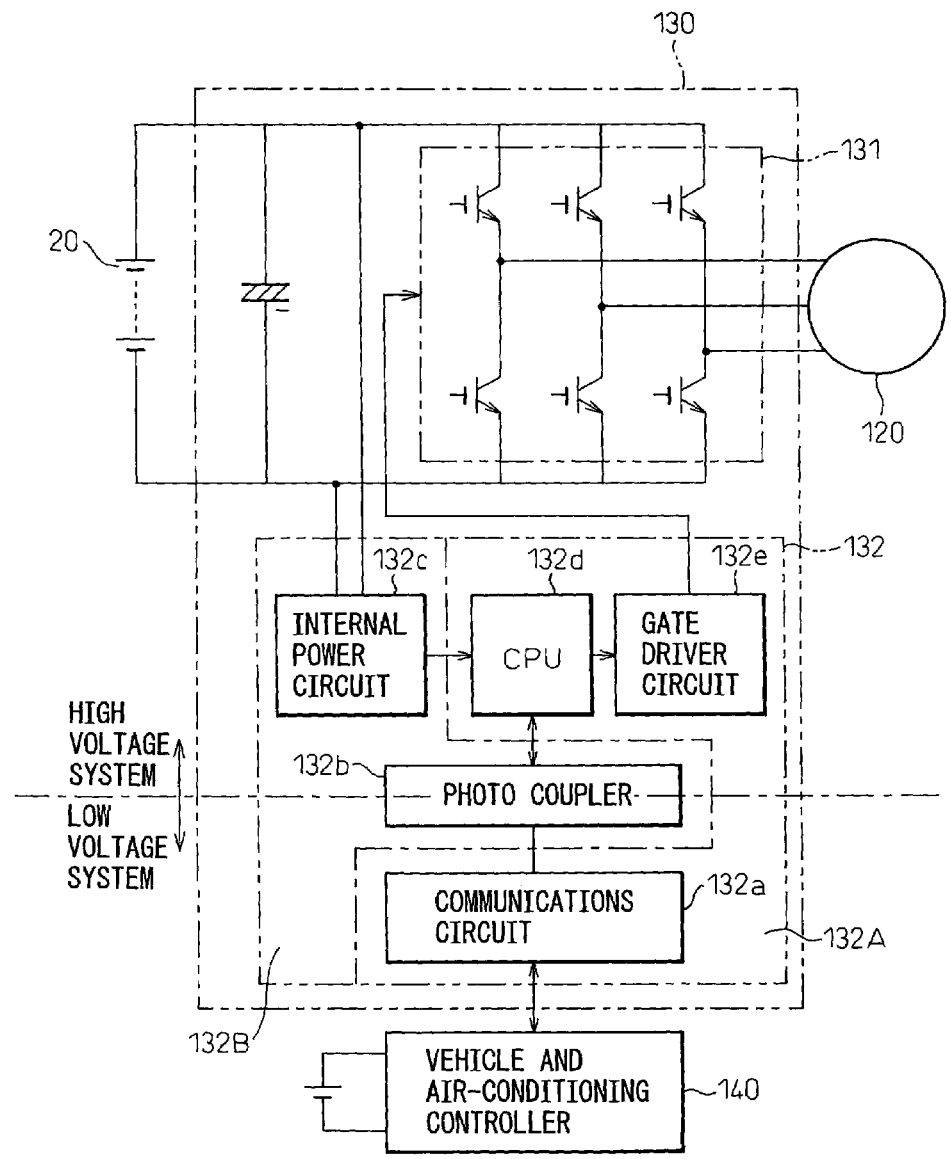

ELECTRIC-POWERED COMPRESSOR

BACKGROUND OF THE INVENTION

1. Field of the Invention

The present invention relates to an electric-powered compressor having a compression mechanism for sucking in and compressing a refrigerant, an electric motor for driving the compression mechanism, and an inverter circuit or other motor drive circuit for driving the motor and is effective if applied to a vehicular steam compression type refrigeration cycle.

2. Description of the Related Art

As an electric-powered compressor of the related art, for example, as described in Japanese Unexamined Patent Publication No. 2000-291557, there is known one comprised of a compression mechanism and a motor formed integrally and having a drive circuit for driving the motor attached to the refrigerant gas suction side of the compression mechanism. More specifically, the housing in which the motor is housed is provided with a refrigerant suction port and the inverter in the drive circuit is attached in close contact with the housing of the motor.

Due to this, the semiconductor switching device in the inverter is cooled by the low temperature refrigerant during the motor operation, so no air-cooled radiator or fan or water-cooled radiator or water piping etc. are necessary and the electric-powered compressor can be made small in size and low in cost.

In the above art, however, the idea of positively cooling the control circuit for controlling the operation of the semiconductor switching device in the drive circuit has never been seen. In general, the heat generated by the control circuit itself is less than the semiconductor switching device, but its own heat resistance is low, so there was the problem that when the motor was not being operated, the reliability could not be sufficiently secured depending on the temperature environment in which the electric-powered compressor was arranged.

SUMMARY OF THE INVENTION

An object of the present invention is to provide an electric-powered compressor enabling improvement of the reliability of a control circuit in a motor drive circuit even when the motor is not being operated.

To attain the above object, there is provided an electric-powered compressor comprised of a compression mechanism for sucking in and compressing a refrigerant and an electric motor for driving the compression mechanism formed integrally and provided at a refrigerant suction side of the compression mechanism with a motor drive circuit for driving the motor, wherein the refrigerant suction side is a housing for storing the compression mechanism and the motor and circulates inside it the suction refrigerant sucked in by the compression mechanism, at least part of a control circuit provided at the motor drive circuit and controlling the operation of a switching device for adjusting the power supplied to the motor is provided abutting against the surface of the refrigerant suction side or a heat conduction path extending from the surface, and a location of the control circuit attached abutting against the surface of the refrigerant suction side or a heat conduction path extending from the surface is an electronic circuit device provided at a circuit board. Due to this, it is possible to cool the switching device and control circuit in the motor drive circuit by a low temperature refrigerant at the time of operation of the motor, so it is possible to improve the reliability.

Further, at the time the motor is not operating, it is possible to positively cool at least part of the control circuit by the surface of the refrigerant suction side held at a lower temperature than the other locations by the refrigerant at the time of operation of the motor or the heat conduction path extending from the surface, so it is possible to improve the reliability of the control circuit. Due to this, it is possible to form a compact electric-powered compressor with an integral motor drive circuit.

Preferably the motor drive circuit is an inverter circuit. Preferably the electronic device is a photo coupler optically coupling input/output signals.

Preferably, an insulating member is interposed between at least part of the control circuit and the surface of the refrigerant suction side or a heat conduction path extending from the surface. Due to this, the current flowing through the control circuit can be prevented from leaking to the refrigerant suction side.

Preferably, the compression mechanism compresses a refrigerant in a vehicular refrigeration cycle. This is suitable when the temperature environment in which the electric-powered compressor is arranged, such as a vehicle, is severe.

BRIEF DESCRIPTION OF THE DRAWINGS

These and other objects and features of the present invention will become clearer from the following description of the preferred embodiments given with reference to the attached drawings, wherein:

FIG. 1A is a schematic view of a steam compression type refrigeration cycle using an electric-powered compressor in a first embodiment of the present invention, FIG. 1B is a partial cross-sectional view of an electric-powered compressor.

FIG. 2 is a schematic view of a position of mounting an electric-powered compressor in a vehicle engine compartment;

FIG. 3 is a partial cross-sectional view of an electric-powered compressor in a first embodiment of the present invention;

FIG. 4 is a circuit diagram of the configuration of an inverter circuit; and

DESCRIPTION OF THE PREFERRED EMBODIMENTS

Preferred embodiments of the present invention will be described in detail below while referring to the attached figures.

First Embodiment

Figure 1C:
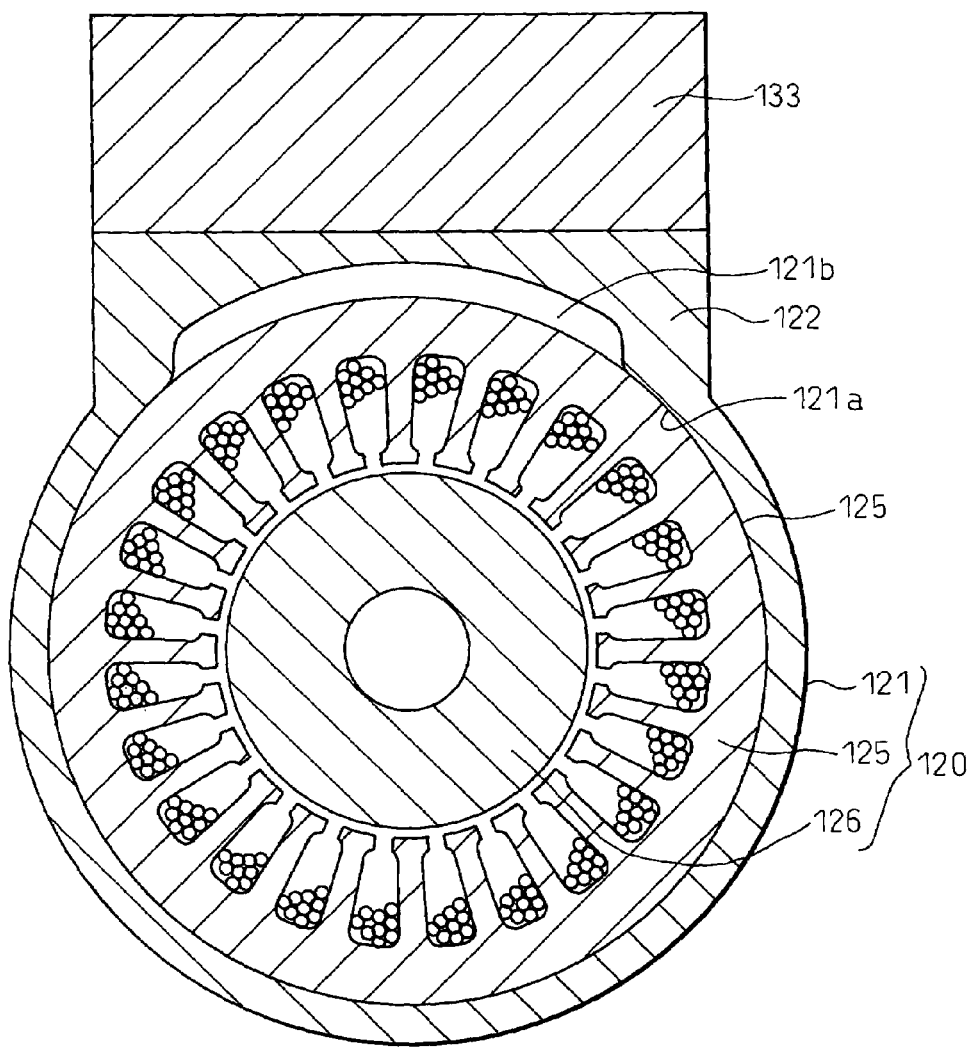
FIG. 1C is a cross-sectional view along the line I—I of FIG. 1B.

Below, a first embodiment of the present invention will be explained based on FIGS. 1A and 1B to FIG. 4. FIG. 1A is a schematic view of a vehicular steam compression type refrigeration cycle using an electric-powered compressor 100 with an integral motor drive circuit according to the present embodiment, FIG. 1B is a partial cross-sectional view of an electric-powered compressor, and FIG. 1C is a cross-sectional view along the line I—I of FIG. 1B. FIG. 2 is a schematic view of a position of mounting an electric-powered compressor 100 in an engine compartment 1a of the vehicle 1. FIG. 3 is a partial cross-sectional view of an electric-powered compressor 100 in the present embodiment. FIG. 4 is a circuit diagram of the configuration of an inverter circuit 130.

As shown in FIG. 1A, 200 is a condenser for cooling the refrigerant discharged from the electric-powered compressor 100, while 300 is a receiver (vapor-liquid separator) for separating the refrigerant flowing out from the condenser 200 into the vapor phase refrigerant and liquid phase refrigerant and discharging the liquid phase refrigerant and storing the excess refrigerant in the refrigeration cycle.

Further, 400 is an expansion valve serving as a pressure reducing means for reducing the pressure of the liquid phase refrigerant flowing out from the receiver 300, while 500 is an evaporator for evaporating the refrigerant reduced in pressure in the expansion valve 400. Further, in the present embodiment, an expansion valve 400 was used as the pressure reducing means, but the invention is not limited to this. It is also possible to adopt a fixed constriction as the pressure reducing means.

As shown in FIG. 2, the electric-powered compressor 100 is arranged inside an engine compartment 1a of the vehicle between a condenser 200 and radiator 600 provided with an electric fan 610 and an engine 10 and is positioned so as to receive the heat (radiant heat) exhausted from the condenser 200, radiator 600, and exhaust manifold 10a of the engine 10. Note that the ambient temperature of the electric-powered compressor 100 at the time the vehicle 1 is running is a level of 100 to 120° C.

Here, the structure of the electric-powered compressor 100 will be explained. As shown in FIG. 1, the electric-powered compressor 100 is provided with a compression mechanism 110 for sucking in and compressing the refrigerant (in this example, a scroll compression mechanism), an electric motor 120 for driving this compression mechanism 110 (in this example, a three-phase brushless DC motor), and an inverter circuit 130 serving as a motor drive circuit for driving the motor 120.

Reference numeral 111 is a compression mechanism housing made of an aluminum alloy housing the compression mechanism 110, while 121 is a motor housing made of an aluminum alloy housing the motor 120. The compression mechanism housing 111 and motor housing 121 form the housing of the present invention and has a refrigerant circulating inside it.

As shown in FIGS. 1B and 1C, the motor housing 121 has a stator 125 and a rotor 126. The stator 125 fits tightly with the outer circumference 125a and the inner circumference 121a of the motor housing 121. The shaft 126a of the rotor 126 is rotatably supported by bearings 126b so that the rotor 126 rotates inside the stator 125. Part of the inside wall 121a of the motor housing 121 (upper side of FIG. 1C) is formed with a recess 121b. A clearance 121b is formed between the outer surface 125a of the stator 125 and the inner wall 121a and is designed so that the refrigerant flows through the clearance 121b.

The motor housing 121 is formed with a suction port 123 connected to a refrigerant outlet side of the evaporator 500. The compression mechanism housing 111 is formed with a discharge port 112 connected to the refrigerant inlet side of the evaporator 200.

Note that the scroll compression mechanism 110 changes the volume of the working chamber to suck in and compress the refrigerant by making an orbiting scroll orbit around a fixed scroll. The fixed scroll also functions as part of the compression mechanism housing 111.

As shown in FIG. 3 and FIG. 4, the side wall 122 of the motor housing 121 (upward side in FIG. 3) has a casing 133 arranged at it. The casing 133 is provided inside it with an inverter circuit 130 as a motor drive circuit.

The inverter circuit 130 is comprised of a switching device 131 and a control circuit 132. The switching device 130 has a plurality of switch parts. Due to the on-off operation, the DC voltage supplied from the motor power source (200V battery) is converted to three-phase AC voltage (power adjusted) and supplied as current to drive the motor 120. The switch device 131 can become a heat source generating heat by power loss, so is fixed so as to abut against the side wall 122 of the motor housing 121.

Further, the control circuit 132 controls the operation of the switching device 131 and is comprised of a communications circuit 132a for transferring control use communications signals between the vehicle 1 and a not shown air-conditioning controller, a photo coupler 132b for optically coupling the input/output signals to the following CPU 132d side, an internal power circuit 132c, a gate driver circuit 132e, etc. Further, the control circuit 132 operates and performs various computations based on the signals from the vehicle and the air-conditioning controller 140 so long as the engine 10 is on regardless of whether the motor 120 is operating or at a stop.

The circuits 132a to 132e of the control circuit 132 are specifically formed by mounting electronic circuit devices 150 on a printed circuit board (corresponding to the circuit board of the present invention) 132A (132B). Further, among the circuits 132a to 132e of the electronic circuit devices 150, the photo coupler 132b and internal power circuit 132c for which heat resistance particularly cannot be sufficiently secured are mounted on the printed circuit board 132B so as to abut against the side wall (corresponding to refrigerant suction side of the present invention) 122 of the motor housing 121.

Further, the remaining communications circuit 132a, CPU 132d, and gate driver circuit 132e are arranged to be near the side wall when the printed circuit board 132A is fixed to the support member 134 sticking out from the side wall 122.

Further, an insulating member 135 is interposed between the photo coupler 132b and switching device 131 and the side wall 122. The insulating member 135 is a silicone rubber sheet in which a nonconductive inorganic filler is filled, has heat conductivity, and electrically insulates the photo coupler 132b and switching device 131 from the side wall 122.

Next, the operation of the electric-powered compressor 100 according to the above configuration will be explained. Based on the signals from the vehicle 1 and the air-conditioning controller, the switching device 131 is operated by the control circuit 132 and the motor 120 is driven by power supplied from the motor power source 20. This being the case, the motor 120 drives the compression mechanism 110 linked with the motor 120 and sucks refrigerant into the compression mechanism 110. Along with this, gaseous state low temperature refrigerant (suction refrigerant) flows in from the suction port 123. The refrigerant flowing in from the suction port 123 cools the motor 120 while flowing through the inside of the motor housing 121, then is compressed by the compression mechanism 110 to become a high temperature gaseous state refrigerant which is then discharged from the discharge port 112.

Part of the suction refrigerant heading from the suction port 123 to the compression mechanism 110 flows upward in the figure in the motor housing 121. The suction refrigerant absorbs the heat from the switching device 131 and control circuit 132 receiving heat at the side wall 122 of the motor housing 121, in particular the heat from the switching device 131 constituting the main heat source of the inverter circuit 130, and cools the inverter circuit 130.

Further, even when the motor 120 is stopped, the switching device 131 and control circuit 132, in particular here the photo coupler 132b and internal power circuit 132c, are cooled by the side wall 122 of the motor housing 121 held at a low temperature (10 to 30° C. level) by the low temperature refrigerant at the time of operation of the motor 120.

In this way, since the switching device 131 and the control circuit 132 in the inverter circuit 130 can be cooled by the low temperature refrigerant at the time of operation of the motor 120, the reliability can be improved.

Further, at the time the motor 120 is not operating, it is possible to positively cool at least part of the control circuit 132, that is, here, the photo coupler 132b and the internal power circuit 132c generally inferior in heat resistance, by the side wall 122 of the motor housing 121 held at a lower temperature than the other locations by the refrigerant at the time of operation of the motor 120, so it is possible to improve the reliability of the control circuit 132.

Further, since the surface provided abutting against the control circuit 132 is made the side wall 122 of the motor housing 121, it is possible to make a compact electric-powered compressor 100 with an integral motor drive circuit. Further, since the location of the control circuit 132 provided abutting against the side wall 122 is the electronic circuit devices 150 mounted on the printed circuit board 132A, the control circuit 132 is effectively cooled.

Further, since an insulating member is interposed between the switching device 131 and photo coupler 132b and the side wall 122, the current flowing through the control circuit 132 can be prevented from leaking to the motor housing 121.

Second Embodiment

Figure 5:
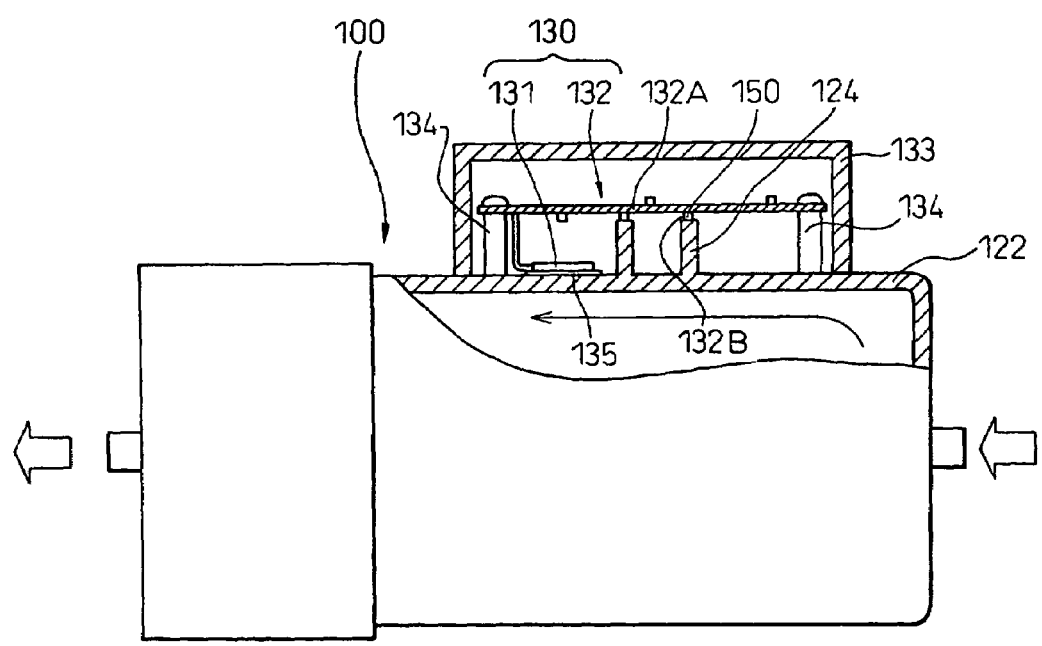
FIG. 5 is a partial cross-sectional view of an electric-powered compressor in a second embodiment of the present invention.

A second embodiment of the present invention is shown in FIG. 5. FIG. 5 is a partial cross-sectional view showing the electric-powered compressor 100 in the second embodiment.

Here, the electronic circuit devices 150 of the control circuit 132 are provided on a single printed circuit board 132A and the printed circuit board 132A is affixed to a support member 134. Further, the electronic circuit devices 150 of the circuit particularly inferior in heat resistance in the control circuit 132 (the photo coupler 132b etc. as in the first embodiment) are made to abut against the front end of the heat conduction path 124 sticking out integrally from the side wall 122.

In this way, even when the control circuit 132 is integrally provided and is fixed to the support member 134, it is possible to dissipate the heat from the electronic circuit devices 150 to the side wall 122 by the heat conduction path 124, so it is possible to obtain similar effects as in the first embodiment.

Other Embodiments

In the first and second embodiments, the control circuit 132 was provided at the side wall 122 of the motor housing 121, but the circuit may also be formed at the bottom at the right side in FIG. 3 and FIG. 5. Further, it is also possible to provide it at the surface of the refrigerant piping connecting the evaporator 500 and suction port 123.

Further, the explanation was given taking as an example an inverter circuit 130 as the motor drive circuit, but the invention is not limited to this. It is also possible to use for example a chopper system to drive a DC motor.

Further, the photo coupler 132b and internal power circuit 132c in the control circuit 132 were made to abut against the side wall 122 or heat conduction path 124 of the motor housing 121, but it is also possible to do this for other circuits in accordance with the heat resistance (CPU 132d etc. accompanied with self heat generation).

Further, in the first and second embodiments, a heat conduction sheet was used as the insulating member 135, but it is also possible to use a silicone gel etc.

Further, in the first and second embodiments, the compression mechanism 110 was described as a scroll type, but the invention is not limited to this. It may also be a vane type or a swash plate type variable displacement type. Further, the positions of the discharge port 112 and the suction port 123 are not limited to the positions of the first and second embodiments so long as the suction refrigerant flows inside the motor housing 121. Further, the motor 120 was explained as being a three-phase brushless DC motor, but the invention is not limited to this and it may be an AC motor etc. as well.

While the invention has been described with reference to specific embodiments chosen for purpose of illustration, it should be apparent that numerous modifications could be made thereto by those skilled in the art without departing from the basic concept and scope of the invention.

What is claimed is:

1. An electric-powered compressor comprised of a compression mechanism for sucking in and compressing a refrigerant and an electric motor for driving said compression mechanism formed integrally and provided at a refrigerant suction side of said compression mechanism with a motor drive circuit for driving said motor, wherein
    said refrigerant suction side is a housing for storing said compression mechanism and said motor and circulates inside it the suction refrigerant sucked in by said compression mechanism,
    at least part of a control circuit provided at said motor drive circuit and controlling the operation of a switching device for adjusting the power supplied to said motor is provided abutting against the surface of said refrigerant suction side or a heat conduction member extending from said surface, and
    said control circuit is provided on a circuit board that is supported by a support member, and
    the heat conduction member extends integrally from an outer wall of the housing toward the circuit board and abuts against an electronic circuit device of the control circuit.

2. An electric-powered compressor as set forth in claim 1, wherein said electronic circuit device is a photo coupler optically coupling input/output signals.

3. An electric-powered compressor as set forth in claim 1, wherein said motor drive circuit is an inverter circuit.

4. An electric-powered compressor as set forth in claim 1, wherein an insulating member is interposed between at least part of said control circuit and the surface of said refrigerant suction side or said heat conduction member.

5. An electrical compressor as set forth in claim 1, wherein said compression mechanism compresses a refrigerant in a vehicular refrigeration cycle.

6. An electric-powered compressor comprising:
    a compression mechanism for drawing and compressing a refrigerant;
    an electric motor for driving the compression mechanism, wherein the electric motor is formed integrally with and provided at a suction side of the compression mechanism;

a housing that houses the compression mechanism and the electric motor, wherein a refrigerant suction path of the compression mechanism is formed in a wall of the housing, and refrigerant drawn in by the compression mechanism circulates inside the housing;

a heat conduction member that is integral with the wall and extends outward from an outer surface of the wall, wherein a proximal end of the heat conduction member is in close proximity to the refrigerant suction path so that the heat conduction member is cooled by the refrigerant;

a motor drive circuit for driving the motor, wherein
  the motor drive circuit includes a control circuit, which controls the operation of a switching device for adjusting the power supplied to the motor,
  the control circuit is provided on a circuit board that is supported by at least one support member such that the control circuit is spaced from the wall, and
  an electronic circuit device of the control circuit is coupled to a distal part of the heat conduction member such that a heat transfer path is formed from the electronic circuit device to the wall through the heat conduction member and such that the electronic circuit device is cooled by the heat conduction member.

7. An electric-powered compressor as set forth in claim 6, wherein the electronic circuit device is a photo coupler optically coupling input/output signals.

8. An electric-powered compressor as set forth in claim 6, wherein the motor drive circuit is an inverter circuit.

9. An electrical compressor as set forth in claim 6, wherein the compressor is part of a vehicle refrigeration circuit.

\* \* \* \* \*